US010425339B2

(12) United States Patent
Thubert et al.

(10) Patent No.: US 10,425,339 B2
(45) Date of Patent: Sep. 24, 2019

(54) MULTI-HOMED LOAD-BALANCED RATE-BASED TUNNELS

(71) Applicant: Cisco Technology, Inc., San Jose, CA (US)

(72) Inventors: Pascal Thubert, La Colle sur Loup (FR); Pierre Pfister, Angers (FR)

(73) Assignee: Cisco Technology, Inc., San Jose, CA (US)

( * ) Notice: Subject to any disclaimer, the term of this patent is extended or adjusted under 35 U.S.C. 154(b) by 400 days.

(21) Appl. No.: 15/332,020

(22) Filed: Oct. 24, 2016

(65) Prior Publication Data

US 2018/0115487 A1    Apr. 26, 2018

(51) Int. Cl.
| | | |
|---|---|---|
| *H04L 12/803* | (2013.01) | |
| *H04L 29/06* | (2006.01) | |
| *H04L 29/08* | (2006.01) | |
| *H04L 12/28* | (2006.01) | |
| *H04L 29/12* | (2006.01) | |
| *H04L 1/00* | (2006.01) | |

(52) U.S. Cl.
CPC ............ *H04L 47/125* (2013.01); *H04L 65/60* (2013.01); *H04L 2001/0096* (2013.01)

(58) Field of Classification Search
CPC .................. H04L 65/60; H04L 47/125; H04L 2001/0092
See application file for complete search history.

(56) References Cited

U.S. PATENT DOCUMENTS

| | | | | |
|---|---|---|---|---|
| 2010/0142376 A1* | 6/2010 | Lou | ......................... | H04L 47/10 370/236 |
| 2012/0317300 A1* | 12/2012 | Huang | ................ | H04L 65/4092 709/231 |
| 2015/0200806 A1* | 7/2015 | Donley | ................... | H04L 45/58 370/392 |
| 2015/0245409 A1* | 8/2015 | Medapalli | ............. | H04W 76/20 370/329 |
| 2016/0323062 A1* | 11/2016 | Yang | ................... | H03M 13/154 |

* cited by examiner

*Primary Examiner* — Abdulkader M Alriyashi
(74) *Attorney, Agent, or Firm* — Behmke Innovation Group LLC; James Behmke; Stephen D. LeBarron (57) ABSTRACT

In one embodiment, a splitting device in a computer network transmits to a combining device first and second portions of a data stream via first and second tunnels, respectively, where packets of the data stream indicate a time of transmission of the packets from the splitting device, a first and second transmission rate of the packets on a respective one of the first and second tunnels, and sequencing information of the packets within the data stream. The splitting device receives from the combining device a first and second receive rate of the packets for each of the first and second tunnels, respectively. In response to the first receive rate being less than the first transmission rate, the splitting device reduces the first transmission rate and increases the second transmission rate.

13 Claims, 11 Drawing Sheets

MULTI-HOMED LOAD-BALANCED RATE-BASED TUNNELS

TECHNICAL FIELD

The present disclosure relates generally to computer networks, and, more particularly, to multi-homed load-balanced rate-based tunnels.

BACKGROUND

Home networks are expected to migrate to multi-homed models where two different service providers would provide Provider Dependent (PD) prefixes, and filter traffic coming from the home network with the wrong source address as not topologically correct. One reason to use a dual-homed model is high availability, but another major reason is getting increased aggregated bandwidth. Since connection started with a given address should (e.g., must) transit through the service provider network that corresponds to the prefix, a good load balancing appears to require participation from the client stack(s) so as to get different streams through different networks in a balanced fashion. However, this is an NP-Complete problem, which can hardly be solved in an optimal fashion by distributed clients.

An alternate approach is proposed on the market whereby an over-the-top (OTP) content provider (such as a NET-FLIX) would establish one or more tunnels to a third router at home or directly to the home consumer device, and expose a third (OTP) prefix there. The tunnel technology may for instance leverage various encapsulation techniques, using the home prefixes from the ISPs as locators, and the third (OTP) prefix as an identifier. This model is generally used as a plan A—plan B technique, whereby the video stream is sent on one of the tunnels and the other is ready for a quick fall back. In a variation of the model, the tunnels are in completely different content delivery networks (CDNs) to augment diversity.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a splitting device in a computer network transmits to a combining device first and second portions of a data stream via first and second tunnels, respectively. Packets of the data stream indicate a time of transmission of the packets from the splitting device, a first and second transmission rate of the packets a respective one of the first and second tunnels, and sequencing information of the packets within the data stream. The splitting device receives from the combining device a first and second receive rate of the packets for each of the first and second tunnels, respectively. In response to the first receive rate being less than the first transmission rate, the splitting device reduces the first transmission rate and increases the second transmission rate.

According to one or more additional embodiments of the disclosure, a combining device in a computer network receives from a splitting device first and second portions of a data stream via first and second tunnels, respectively, where packets of the data stream indicate a time of transmission of the packets from the splitting device, a first and second transmission rate of the packets on a respective one of the first and second tunnels, and sequencing information of the packets within the data stream. The combining device determines first and second receive rates of the packets for each of the first and second tunnels, respectively, and transmits to the splitting device the first and second receive rates, thereby causing the splitting device, in response to the first receive rate being less than the first transmission rate, to reduce the first transmission rate and increase the second transmission rate.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
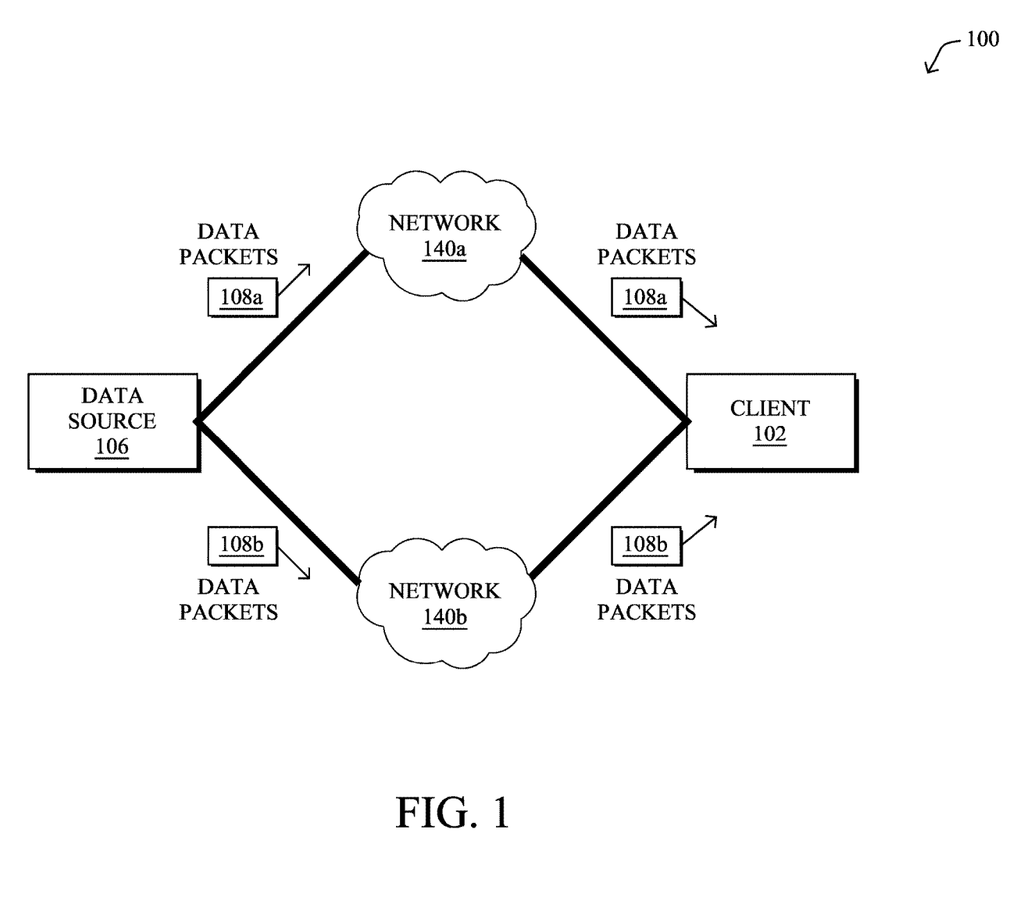
FIG. 1 illustrates an example communication network.

FIG. 1 illustrates an example simplified computer network 100, according to various embodiments of the present disclosure. As shown, client device 102 may be in communication with data source device 106 via one or more computer networks 104 (e.g., 104*a* and 104*b*). Multiple networks are shown in this specific embodiment. Data source device 106 provides data packets 108 through network(s) 104 to client device 102 (e.g., packets 108*a* over network 104*a*, and packets 108*b* over network 104*b*). As will be appreciated, networks 104 may include, but are not limited to, local area networks (LANs), wide area networks (WANs), the Internet, cellular networks, infrared networks, satellite networks, or any other form of data network configured to convey data between computing devices. Illustratively, as a use case example, networks 104 may be internet service provider (ISP) networks providing internet connectivity to a home or business client device 102.

Networks 104 may include any number of wired or wireless links between client device 102 and data source device 106. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, combinations thereof, or the like. Example wireless links may include, but are not limited to, near field-based links, WiFi links, satellite links, cellular links, infrared links, combinations thereof, or the like.

Client device 102 may be any form of electronic device operable to communicate via networks 104. For example, client device 102 may be a desktop computer, a laptop computer, a tablet device, a smartphone, a wearable electronic device (e.g., a smart watch, a head up display, etc.), a smart television, a set-top device for a television, etc.

In general, client device 102 may be operable to receive data packets 108 and render the received content data on an electronic display. For example, client device 102 may execute a media streaming application that, when executed by client device 102, is configured to request streamed media, such as streaming video, audio, or both. In various embodiments, the media streaming application may be a stand-alone application or, alternatively, may be another form of application that is operable to render and display streaming media (e.g., a mobile application, etc.).

Client device 102 may send a request to data source device 106 through networks 104. In response to receiving the request, data source device 106 may send data packets 108 to client device 102 through networks 104. The client device may repeat the above process any number of times with the same or different data source devices, depending on the contents of streaming media.

In general, data source device 106 may be any device operable to provide data packets 108, such as streaming media, to client device 102 through networks 104. In particular, the data source device may be a server present at various known content providers delivering streaming media content, such as video, audio, or combinations thereof.

Data packets 108 (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Figure 2:
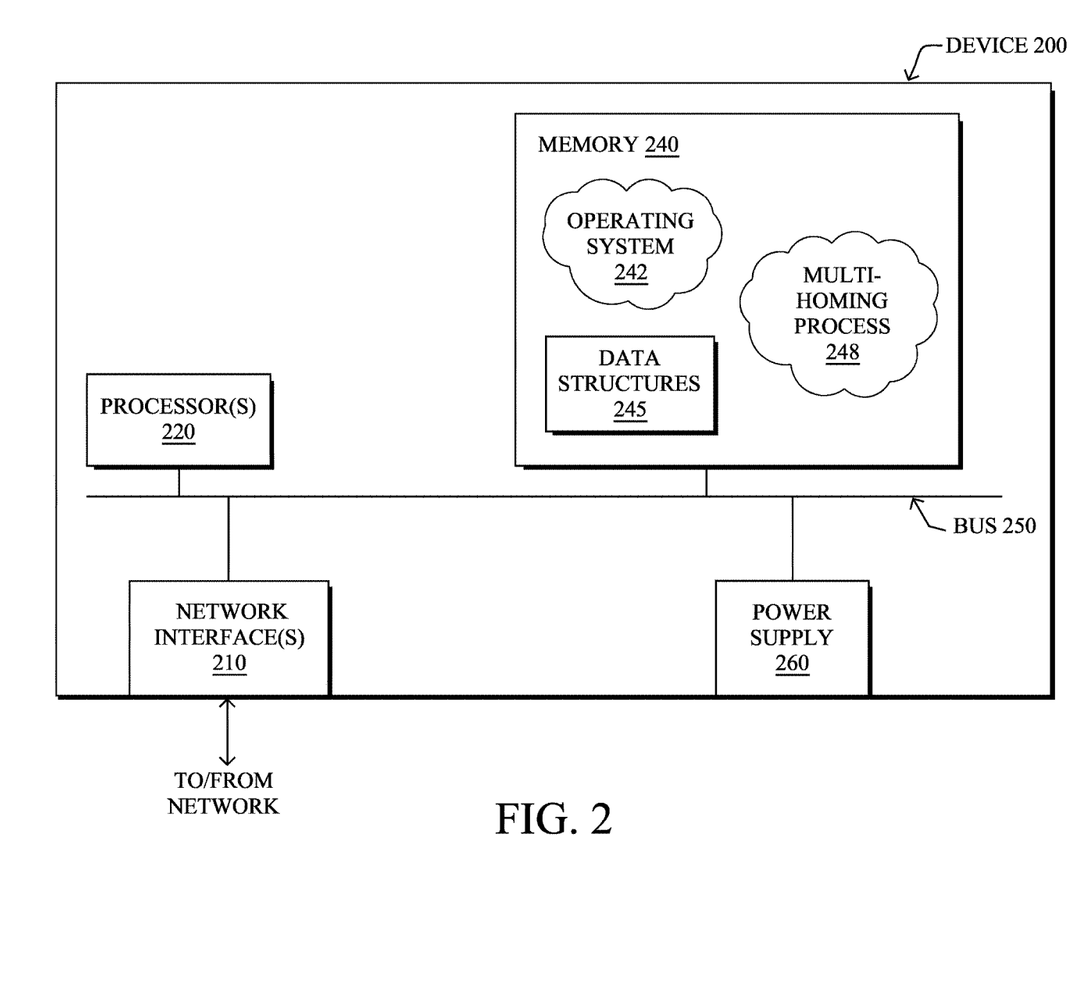
FIG. 2 illustrates an example network device/node.

FIG. 2 is a schematic block diagram of an example node/device 200 that may be used with one or more embodiments described herein. For example, device 200 may be client device 102 or data source device 106 (or, as described further below, a "combining device" or a "splitting device", respectively). The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data to network(s) 104. The network interfaces may be configured to transmit and/or receive data using a variety of different communication protocols. Note, further, that the nodes/devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which is typically resident in memory 240 and executed by the processor, functionally organizes the device by, inter alia, invoking operations in support of software processes and/or services executing on the device. These software processes and/or services may include an illustrative multi-homing process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, a typical end-user or host is connected to just one network. However, it is expected that many hosts, particularly home networks, will migrate to multi-homed models where two different service provider networks are used. The increased aggregated bandwidth would be expected be to result in improvements in reliability and performance. Load balancing across the multi-homed connections, however, is burdened by the relative latency, throughput, and jitter of the tunnels.

Figure 3:
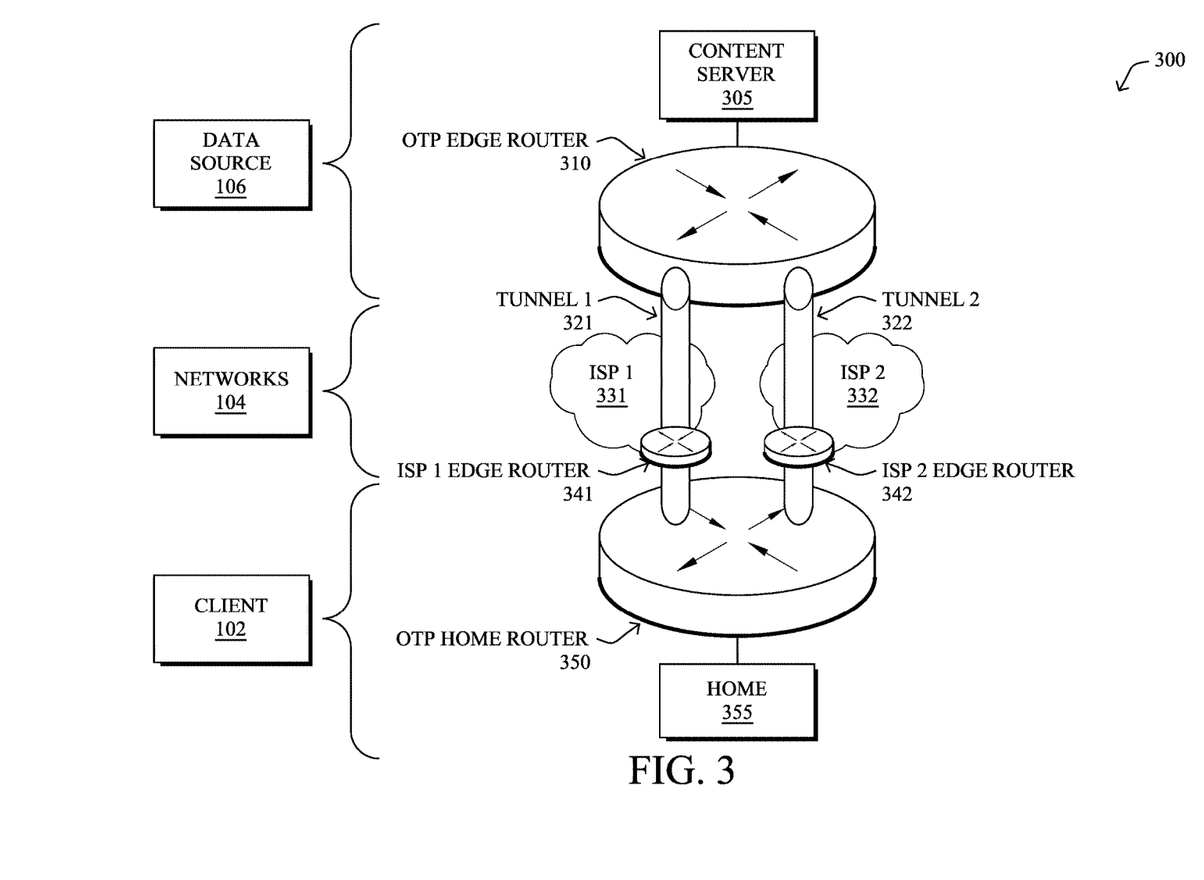
FIG. 3 illustrates an example view of a multi-homed communication network.

A more detailed example of a multi-homed computer network 300 is shown in FIG. 3. As shown, and similar to FIG. 1, client 102 is connected to data source 106 through multiple networks 104. In this specific embodiment, in particular, the client comprises a home network 335 (of one or more client devices) with an over-the-top (OTP) home router 350, and the data source comprises content server 305 (which may be any of various content providers such as NETFLIX) with an OTP edge router 310. One or more tunnels may be established through multiple networks between the data source and the client. As shown, a first tunnel is established through a first network, such as tunnel 1 (321) through internet service provider (ISP) 1 (331), while a second tunnel is established through a second network, such as tunnel 2 (322) through ISP 2 (332). A media stream, which may comprise data, video, audio, or any combination, travels through both tunnels and is directed to the home network via ISP 1 edge router 341 and ISP 2 edge router 342 respectively.

As also mentioned above, the model shown in FIG. 3 has generally been used as a plan A—plan B technique whereby the media stream is sent on one of the tunnels and the other is ready for a quick fall back in the event that the first tunnel fails. Alternatively, both tunnels could be used to provide media streaming. In this case, it is important to provide good load balance between the various network tunnels. However, the relative latency and jitter associated with each tunnel make that difficult, particularly while maintaining high throughput.

Multi-Homed Load-Balanced Rate-Based Tunnels

The techniques described herein provide load balancing between tunnels through multiple networks providing content to a single host by focusing on latency and jitter compensation so as to limit the need for a large reassembly buffer. In some aspects, the proposed techniques provide a new form of tunneling with rate-based flow control and latency evaluation to emulate physical links on which streamed media may be load balanced.

Specifically, as described in greater detail below, a splitting device (e.g., source 106) in a computer network transmits to a combining device (e.g., client 102) first and second portions of a data stream via first and second tunnels, respectively (e.g., over tunnel 1 and tunnel 2, respectively). Packets of the data stream may indicate a time of transmission of the packets from the splitting device, a first and second transmission rate of the packets a respective one of the first and second tunnels, and sequencing information of the packets within the data stream. The splitting device then receives from the combining device a first and second receive rate of the packets for each of the first and second tunnels, respectively. In response to the first receive rate being less than the first transmission rate, the splitting device reduces the first transmission rate and increases the second transmission rate.

Illustratively, the techniques described herein may be performed by hardware, software, and/or firmware, such as in accordance with multi-homing process 248, which may contain computer executable instructions executed by processor 220 (or independent processor of interfaces 210) to perform functions relating to the techniques described herein. The illustrative multi-homing process 248 may be on each of the splitting device (e.g., source 106, or in a particular example, OTP edge router 310) and the combining device (e.g., client 102, or in a particular example, OTP home router 350), and configured to perform particular aspects of the techniques herein based on the device's given role.

Figure 4:
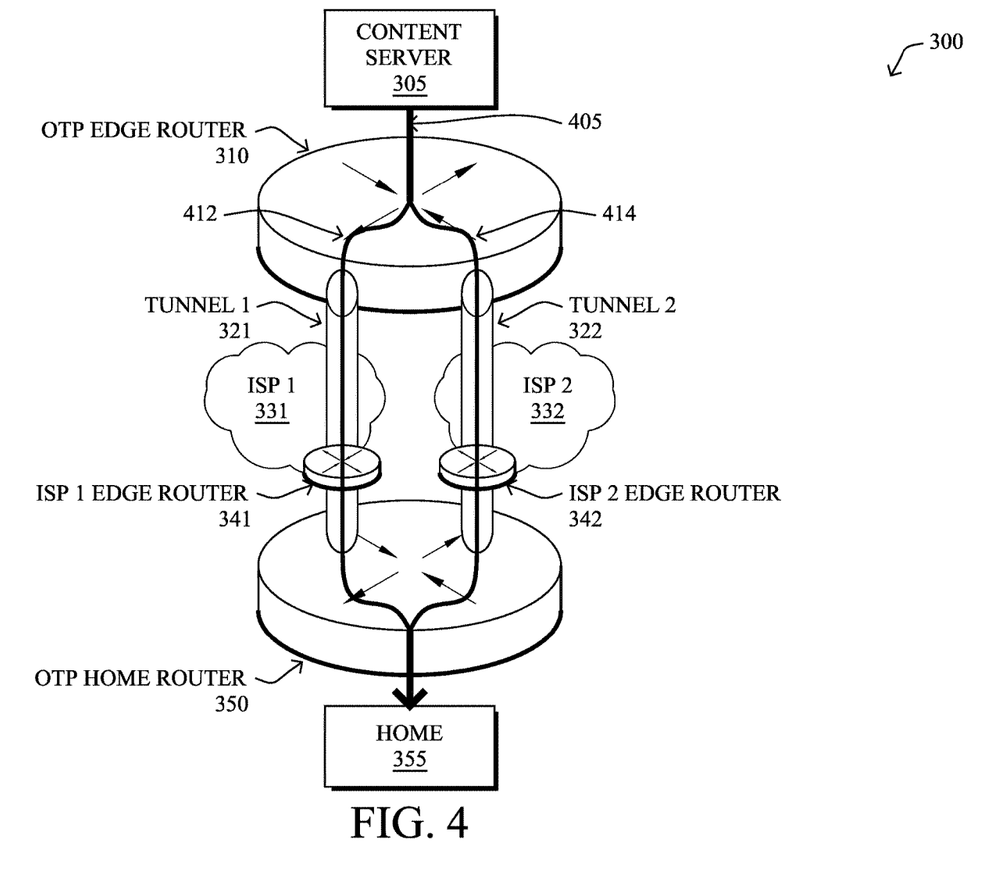
FIG. 4 illustrates an example multi-homed communication network with load balancing.

Operationally, FIGS. 4-8 show aspects of a multi-homed computer network load balancing process of the present disclosure. As generally shown in FIG. 4, content server 305 may provide data stream 405 to home device 355 through multiple networks, such as various internet service provider (ISP) networks. In some embodiments of the present disclosure, the data stream is provided through at least a first network, such as ISP 1 (331), and through at least a second network, such as ISP 2 (332). Additional networks may also be present.

As mentioned above, various tunnels may be established through some or all of these networks. It may also be desirable to establish multiple tunnels through individual networks. In one embodiment of the present disclosure, a first tunnel, such as tunnel 1 (331), may be established through the first network and a second tunnel, such as tunnel 2 (332), may be established through the second network. Various tunnel technologies may be utilized. For example, Network Mobility (NEMO) or Locator Identifier Separation Protocol (LISP) may be used as an encapsulation technique.

In an embodiment of the present disclosure, the data stream may be partitioned or divided into one or more data stream portions by a splitting device, which may then transmit the data portions through the established tunnels. For example, as shown in FIG. 4, data stream 410 is split into separate data stream portions, 412 and 414, by OTP edge router 310 and transmitted respectively through tunnel 1 (321) of ISP 1 (331) and tunnel 2 (322) of ISP 2 (332). The size and rate of the data stream portions can vary according to the techniques herein, depending, for example, on the size of the tunnel, the number of tunnels, and the type and size of the data stream. In some embodiments, the data stream may be substantially equally shared among the various tunnels. For example, the transmitted (e.g., thus "originally expected") rate through each tunnel may be the total stream rate fairly divided by the number of tunnels (e.g., 10 Mb/sec of data could be split into two 5 Mb/sec streams, or three 3.33 Mb/sec streams, and so on), or else may be divided otherwise, such as according to known bandwidth, rate availability, etc. (e.g., 6 Mb/sec on one tunnel, 4 Mb/sec on another, etc.).

As would be appreciated, the data stream provided by the content server may include any number of different types of data. For example, content server 305 may provide various forms of media, such as data, audio, video, video conferencing, online mobile gaming, real-time video monitoring, etc. As such, data stream 405 may include audio data, video data, a combination of audio and video, multiples thereof, or the like.

Figure 5:
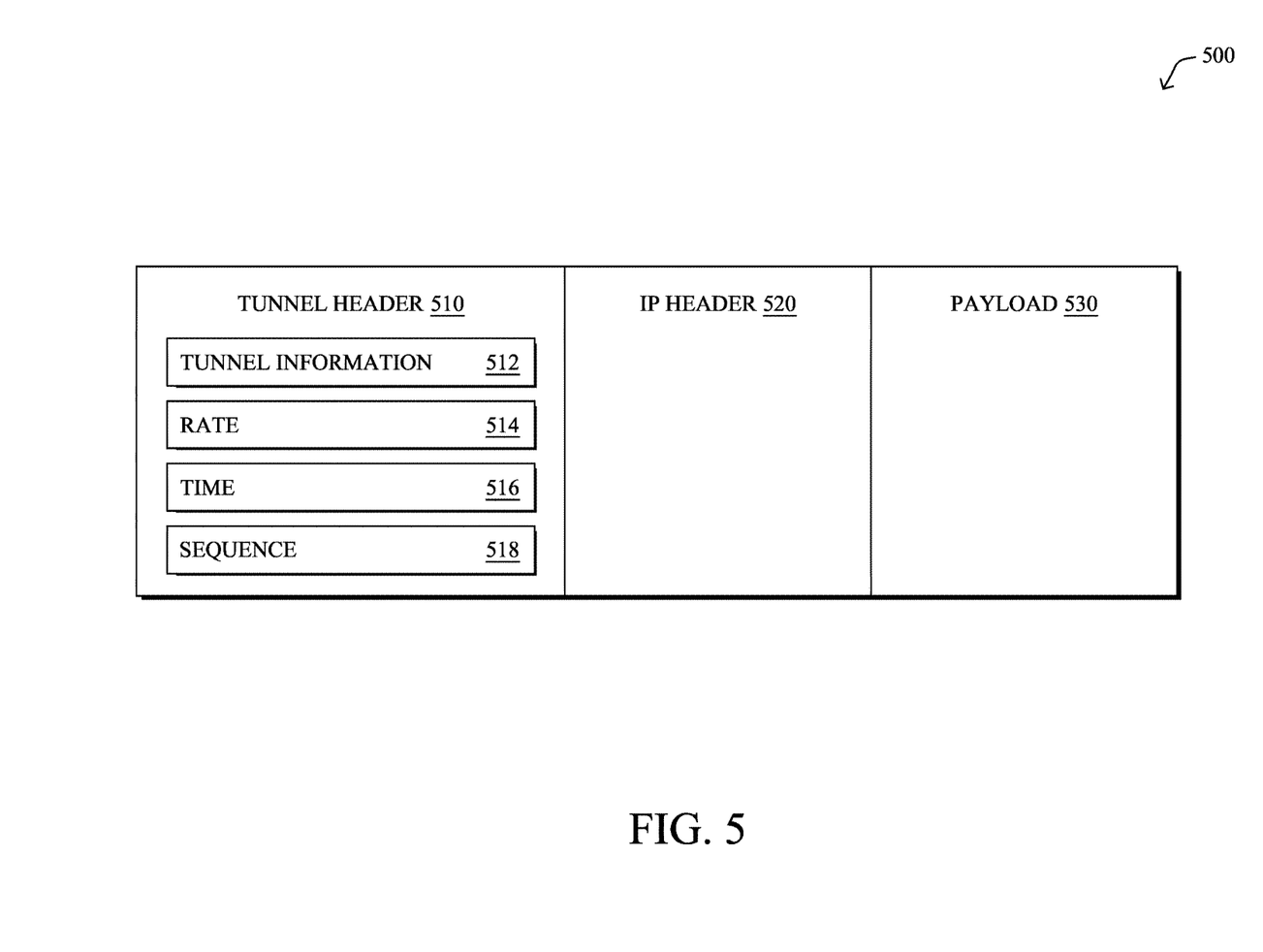
FIG. 5 illustrates an example of data packet.

Those skilled in the art would understand that the data steam comprises data packets generally comprising a payload portion (data) and a header portion (e.g., addresses and other fields). In some embodiments of the present disclosure, in order to be transmitted successfully to the home device through multiple tunnels, data packets of the data stream may further comprise a tunnel header, as shown, for example, in FIG. 5. Thus, FIG. 5 illustrates a simplified data packet 500 (within stream 410) may illustratively comprise tunnel header 510, IP header 520, and payload 530. Generally, the tunnel header may include tunnel information 512, identifying a defined sequence or path through a specific network, and according to the techniques herein, may also have a rate 514, which represents the transmission rate through the respective tunnel, and time 516, indicating the time of transmission of the packets from the splitting device into the respective tunnel. In addition, for use with the techniques herein, the tunnel header may further include sequence 518, which represents the packet sequence in the data stream or set of packet sequences, which may be used for certain aspects of forward error correction (FEC). In this way, a data stream transmitted simultaneously through multiple tunnels may be properly identified and recombined by a client device.

Referring again to FIG. 4, in some embodiments of the present disclosure, the data stream portions 412/414 may be transmitted through their respective tunnels to a combining device, which receives the separate streams and reassembles them for transmission to the home network. For example, as shown, ISP 1 edge router 341 and ISP 2 edge router 342 receive data stream portions 412 and 414 respectively. The streams may then be transmitted to OTP home router 350, which receives and combines the separate data stream portions for transmission to home device 355 (e.g., re-sequencing the packets based on the sequence data 518).

As noted above, it is important to provide good load balancing between the various network tunnels, which is difficult due, for example, to the relative latency and jitter associated with each tunnel. Thus, various embodiments of the present disclosure provide techniques for analyzing the data stream portions transmitted through the tunnels, comparing various aspects of these streamed portions relating to tunnel performance, and adjusting the streams accordingly in response.

Figure 6:
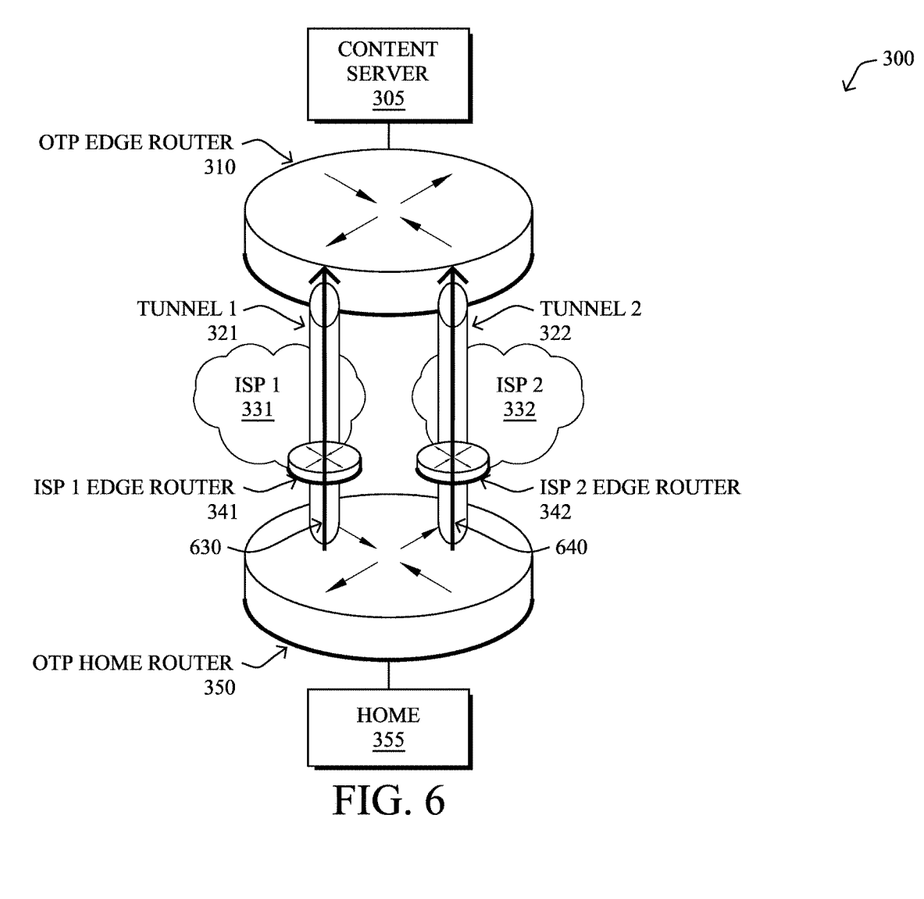
FIG. 6 illustrates an example of sharing receive rates for use with the techniques herein.

According to one aspect of the embodiments herein, to determine the efficacy of the tunnels, the receive rates for the data packets are compared to their transmission rates. To effectuate this, as shown in FIG. 6, the combining device, such as OTP home router 350 at the client, determines a first receive rate 630 and a second receive rate 640 for the data packets received through tunnel 1 (321) and tunnel 2 (332) respectively, and transmits the rates (messages 630/640) to the splitting device, such as OTP edge router 310 at the data source. The receive rates may be transmitted in-band on each tunnel (e.g., tunnel protocol messages) or else out-of-band as a separately configured message (e.g., IP routed). Further, the receive rate messages 630/640 may be sent periodically, at variable rates, or else with intelligence, such as in response to a certain amount of change in the rate over time, a difference in rate between the tunnels, a difference between the transmission rate 514 and the receive rate, a higher incidence of problematic transmissions (higher latency, jitter, un-sequential packets, etc.), and so on.

Figure 7A:
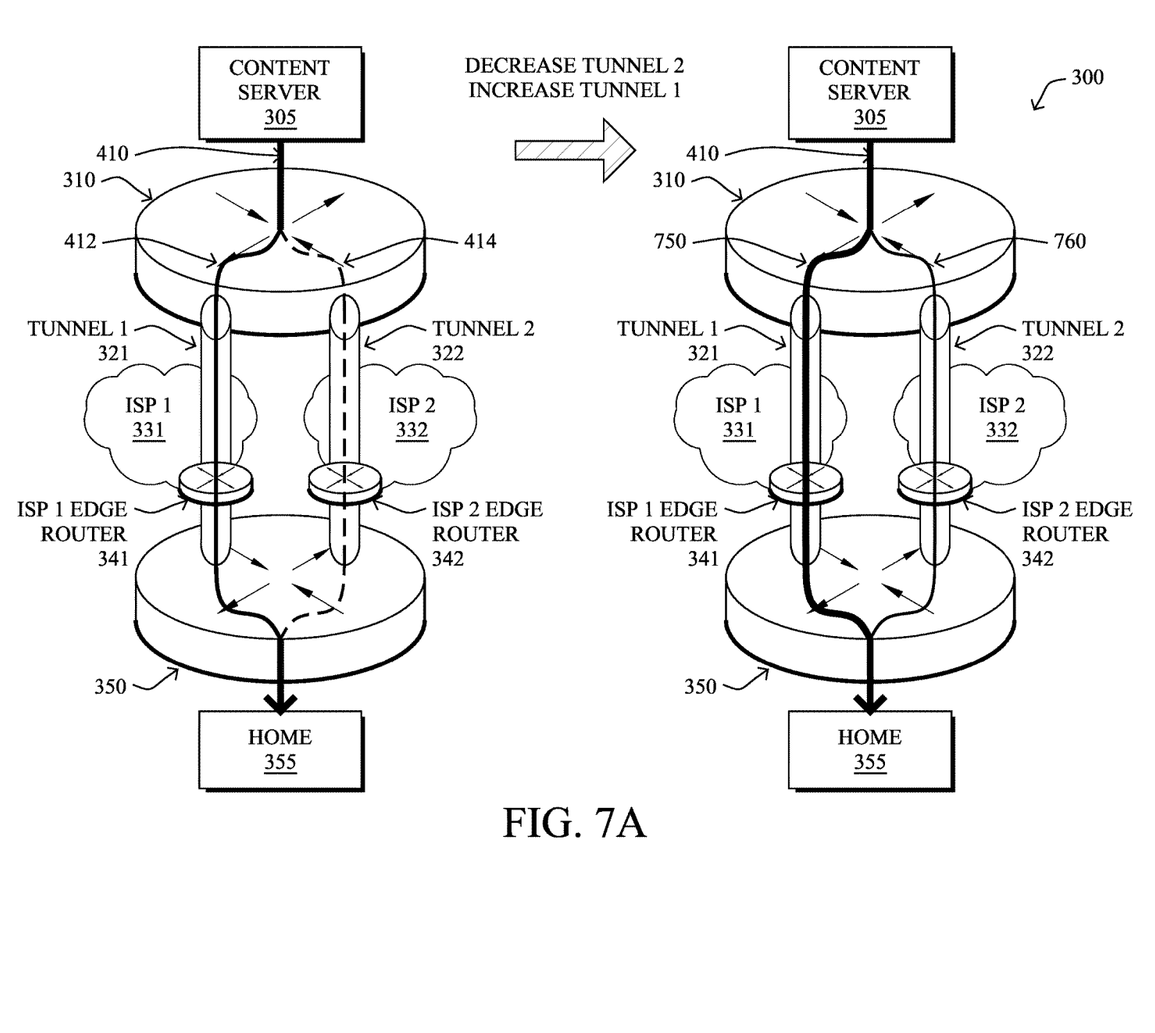
FIGS. 7A-7B illustrate examples of adjusting the load balancing within a multi-homed communication network.
Figure 7B:
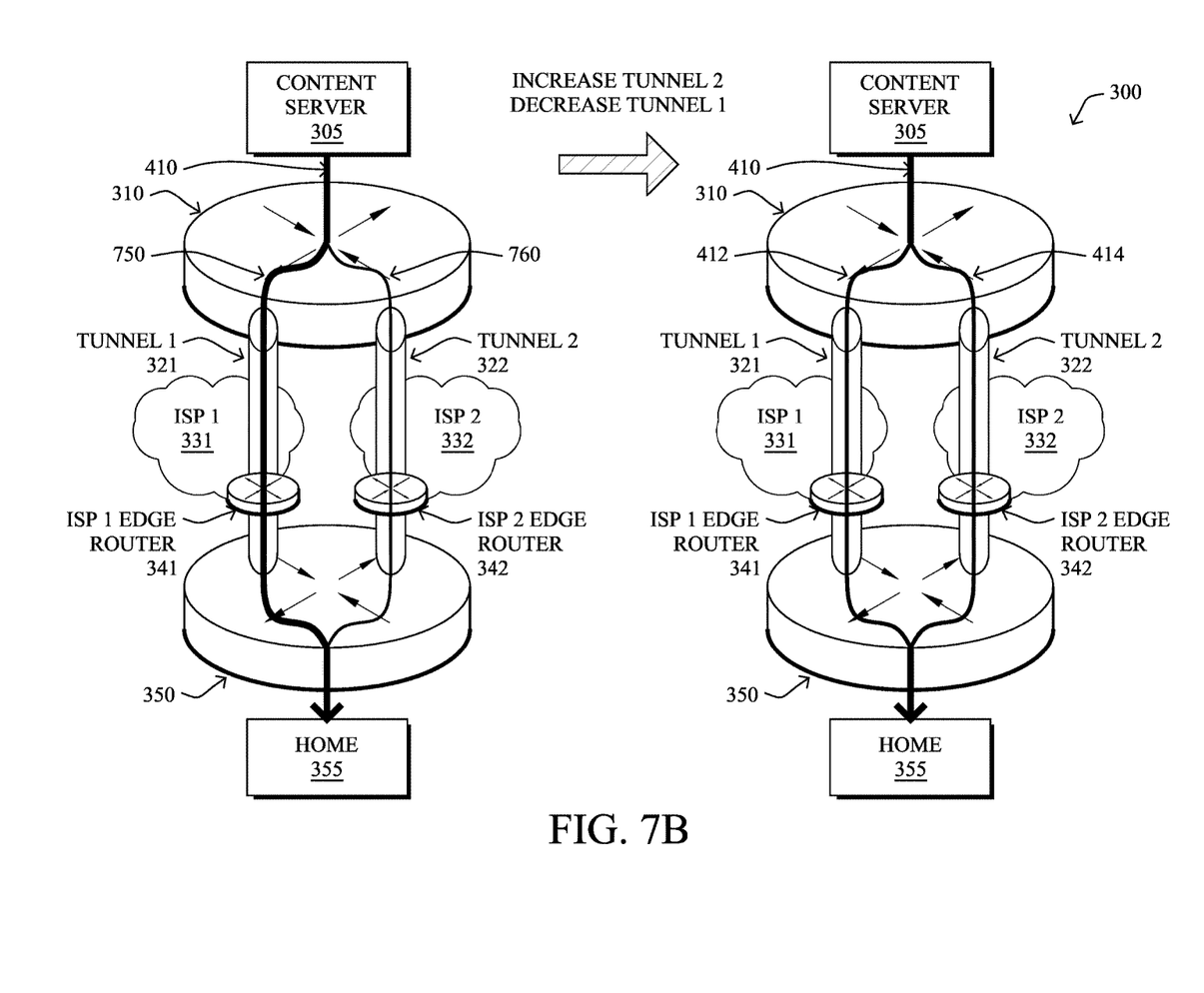

The receive rates are then compared to the transmission rates by the splitting device, and adjustments may be made to account for network operation accordingly. For instance, in the example shown in FIG. 7A, if the receive rate of data stream portion 414 transmitted through tunnel 2 (322), as determined by the combining device (e.g., OTP home router 350), is less than its transmission rate (shown as a hashed transmission of data), this may indicate an issue with that particular tunnel, and that some of the data packets in the data stream portion are either slowed down or discarded. As a result, this tunnel may need to be adapted down. Thus, according to the techniques herein, the splitting device (e.g., OTP edge router 310) may reduce the transmission rate of data stream portion 414 on tunnel 2, resulting in data stream portion 760. In addition, in order to maintain the overall transmission rate of data stream 410, the splitting device may also correspondingly increase the transmission rate of data stream portion 412 on tunnel 1 to produce data stream portion 750 (e.g., changing from an originally divided 5 Mb/sec stream on each tunnel, to, say, 6 Mb/sec on tunnel 1, and 4 Mb/sec on tunnel 2). (Note that in FIG. 7, the changes in the thicknesses of the data stream portions illustrate an increase or decrease in transmission rates.) In this way, the combining device receives data stream packets in portions optimized for the functioning of the tunnels through which they are transmitted (e.g., reduced rates over reduced capability networks/tunnels). Notably, the amount of the decrease in rate may be based on any number of factors, such as a step-by-step program, a rate proportional to the difference between the transmit and receive rates, a rate equal to the receive rate, and so on.

Notably, it is generally preferred that the data load is evenly shared between the tunnels, or least as expected as mentioned above. For this reason, in some embodiments of the present disclosure, the reduced transmission rate is monitored and increased when tunnel function improves. For example, after the reduction in transmission rate shown in FIG. 7A, receive rates for the tunnels may again be determined by the combining device (e.g., OTP home router 350) and transmitted to the splitting device (e.g., OTP edge router 310). If the receive rate is the same as the transmission rate, this generally indicates that the corresponding network/tunnel can support at least this rate. However, when the receive rate and equal transmission rate are still less than the expected or desired transmission rate for the data stream portion through that tunnel (e.g., tunnel 2, (322)), the splitting device may then attempt to increase the transmission rate through the tunnel back toward that expected transmission rate, as shown in FIG. 7B (portions 412/414).

Additionally, at this time, the splitting device may also correspondingly decrease the transmission rate through the other tunnel (e.g., tunnel 1, (321)). The amount of the increase in the rate may be incremental toward the expected rate, and may be based on a configured rate of return (e.g., a slow or a rapid return) to the expected rate, or else any other programmed control-based algorithm to return to expected rate (that is, continuing until the tunnels equally share the data load or otherwise reach their "fair share" at their expected rate). Thus, in some embodiments of the present disclosure, the transmission rates through multiple tunnels may be compared to the corresponding receive rates and adjusted as needed to compensate for changes in tunnel performance, converging toward an expected transmission rate for the data stream on each tunnel.

Figure 8:
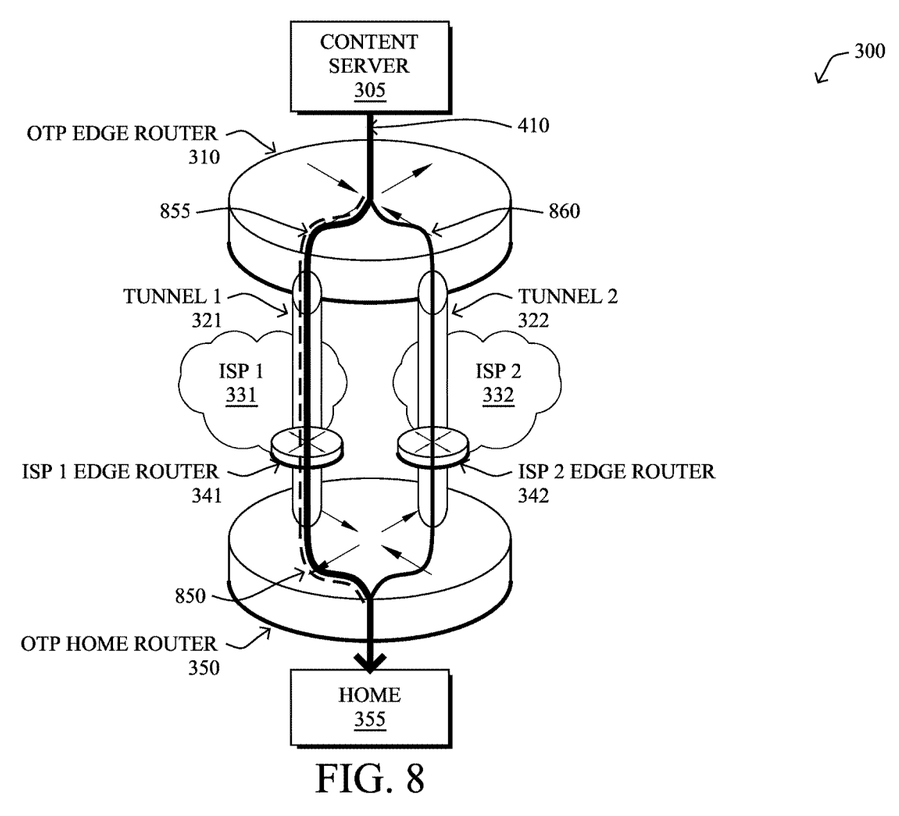
FIG. 8 illustrates an example of adjusting error correction codes while adjusting load balancing within a multi-homed communication network.

In addition, in various embodiments, error correction code adjustments may also be provided and adapted based on the load balance between the tunnels. For example, as shown in FIG. 8, if the receive rate of data stream portion 860, as determined by a combining device, is less than its transmission rate, the splitting device may reduce the transmission rate of that data stream portion and correspondingly increase the transmission rate of the other data stream portion 850, as described above. In addition, since the differences between transmission and receive rates may indicate an issue in the performance of tunnel 2 (322), including, for example, potential risk for data packet losses, additional error correction for the problematic tunnel 2 (322), such as forward error correction (FEC) code, may also be included with the increased data load through the other (and less problematic) tunnel 1 (321). Thus, as shown in FIG. 8, error correction codes 855 for the reduced-rate portion may additionally be provided within the increased-rate data stream portion 850, to provide additional protection for data stream 410 (particularly for the problematic portion) when combined at the combining device. Such error correction code adjustments may also provide addition protection against data packet losses through tunnel 1 (321) due to the increased transmission rate through that tunnel. Note that error correction codes may already exist on each portion (for the same portion on which the error correction codes are transmitted, and/or for the other portion), but FIG. 8 illustrates the increase in code 855 on the "larger" data stream as mentioned above, to compensate for, and help correct, the problematic portion 860.

As a specific example, assume that two tunnels are established through different provider networks. However, as noted above, if one tunnel (a first tunnel) has a limited throughput available, then the techniques provided herein ensure that the other tunnel (a second tunnel) is given additional traffic above its half of the stream throughput, and optionally extra FEC frames that compensate for the loss in the first tunnel. The loss in first tunnel may be due to aggressive push for a rate above that which is currently available in order to fight for bandwidth.

In this example, a tunnel rate can be determined, which is the reference throughput that is streamed over a tunnel. Also, the tunnel effective rate, corresponding to the reference throughput with additional FEC that covers frames sent on other tunnels, can also be determined. The tunnel base rate, which is the initial and normal value for the tunnel rate of a tunnel, can be established as the data stream rate/the number of tunnels, though coefficients may be applied if exact balancing is not the goal. According to the techniques described above, the tunnel rate evolves for each tunnel as needed to cover from the loss on other tunnels, with an objective that all tunnels should converge to the tunnel base rate.

Illustratively, for instance, the tunnel effective rate may be maintained at a value equal to (1+a)*(tunnel rate), where "a" represents the amount of FEC added to the data stream portions (i.e., each stream passing through a tunnel). In this equation, "a" is a positive number, usually more than 0 and less than 1, although "a" can be greater than 1 if, for example, one tunnel is clogged and there is a need for FEC on the other tunnel. By adjusting the value of "a", aggressiveness and quality can be maintained in the face of random losses, even if all the tunnels transport all the data that is provided. Furthermore, "a" may be a constant or may vary, such as exponentially.

Thus, FEC can be sent at (a)*(tunnel rate), which means that if a tunnel drops some amount of traffic, then the FEC from the other tunnels can be used to recover that traffic. Furthermore, when "a" is large, it may be used to explore the capability of a tunnel to take traffic from another tunnel that experiences drops or aggravated latency. If, for example, another tunnel experiences drops, and after some time of successful transmission at (1+a)*(tunnel rate), the new tunnel rate may be increased to (1+a)*(tunnel rate) and the tunnel rate of the tunnel that experienced loss is reduced by the same amount. If a tunnel is operating with a tunnel rate (thus really sending at (1+a)*(tunnel rate) that is less than its base tunnel rate and does not experience loss or aggravated latency, the tunnel rate may be augmented by a factor (1+a) and that rate may be reduced from other tunnels if they are operating above their base tunnel rates.

The rate-based transmission emulates a physical link behavior for a period of time until the rate changes. The present techniques also estimate the latency of the tunnels, and with that, may be used to perform a proper load balancing for real time traffic, including FEC, for higher reliability.

In addition, or alternatively, in further embodiments of the present disclosure, the latency (i.e., transmission delay) of the data stream portions through the tunnels is determined. As discussed above, data packets are both sequenced and timed. Since the time on all data packets on all tunnels is based on the same source, the relative latencies of the tunnels can be determined at the receiver (i.e., the combining device). If the relative latency augments on one tunnel versus another, the rate for that tunnel may be reduced as if there was a loss. In particular, the latency determinations may be transmitted back to the sender for each tunnel, which allows the sender to schedule the transmissions of the frames out of order so that they arrive almost in the right order out of the tunnels. The sender may prepare a number of frames in advance and may send them out of order to compensate for some of the tunnel latency.

Thus, in some embodiments, the combining device may determine a latency for the data stream portions/packets on each tunnel, which may be transmitted to the splitting device. If there is a difference between the latency of the data stream portions, the time of transmission of the packets may be adjusted to compensate. In this way, packets of substantially close sequential information may be received by the combining device through each of the tunnels at substantially the same time.

Furthermore, in embodiments of the present disclosure, an address prefix for the combining device may be advertised to provide more ready access to the device. For example, in a home network using a home networking control protocol (HNCP) services, a dedicated prefix may be advertised in additional to existing prefixes in order to allow the host access to the aggregated service. The host may select their source addresses from available provider dependent (PD) prefixes. In addition, in a multi-router multi-homed network running HNCP, the IPv6 prefix received by the OTP home router may be advertised using HNCP as an additional prefix which gives access to the service to hosts throughout the whole network. The OTP home router may also advertise native prefixes in order to give hosts the opportunity to decide whether an application should use, for example, ISP 1 (331), ISP 2 (332), or the aggregated throughput service.

Figure 9:
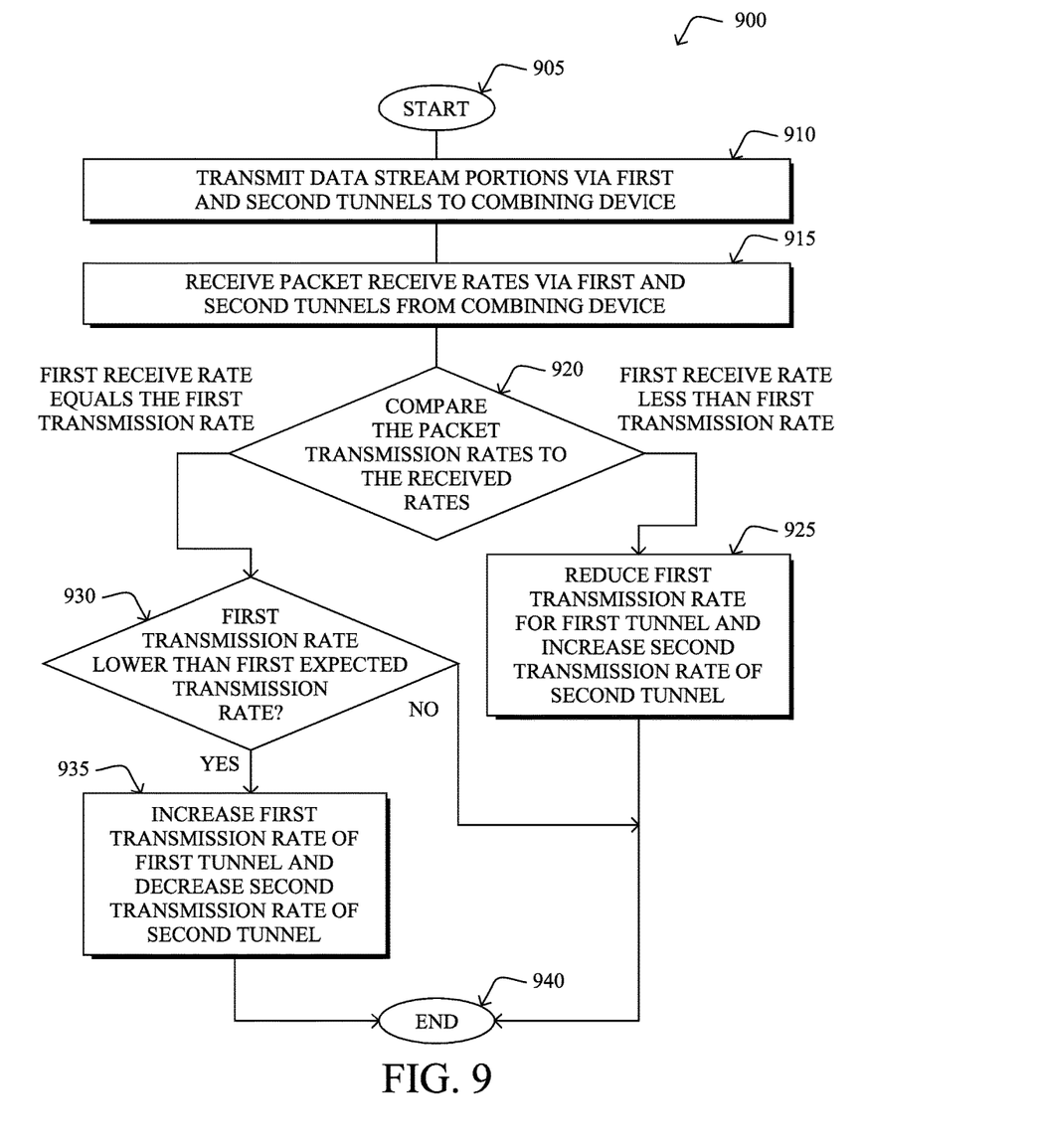
FIGS. 9-10 illustrate example simplified procedures for load balancing a multi-homed communication network.
Figure 10:
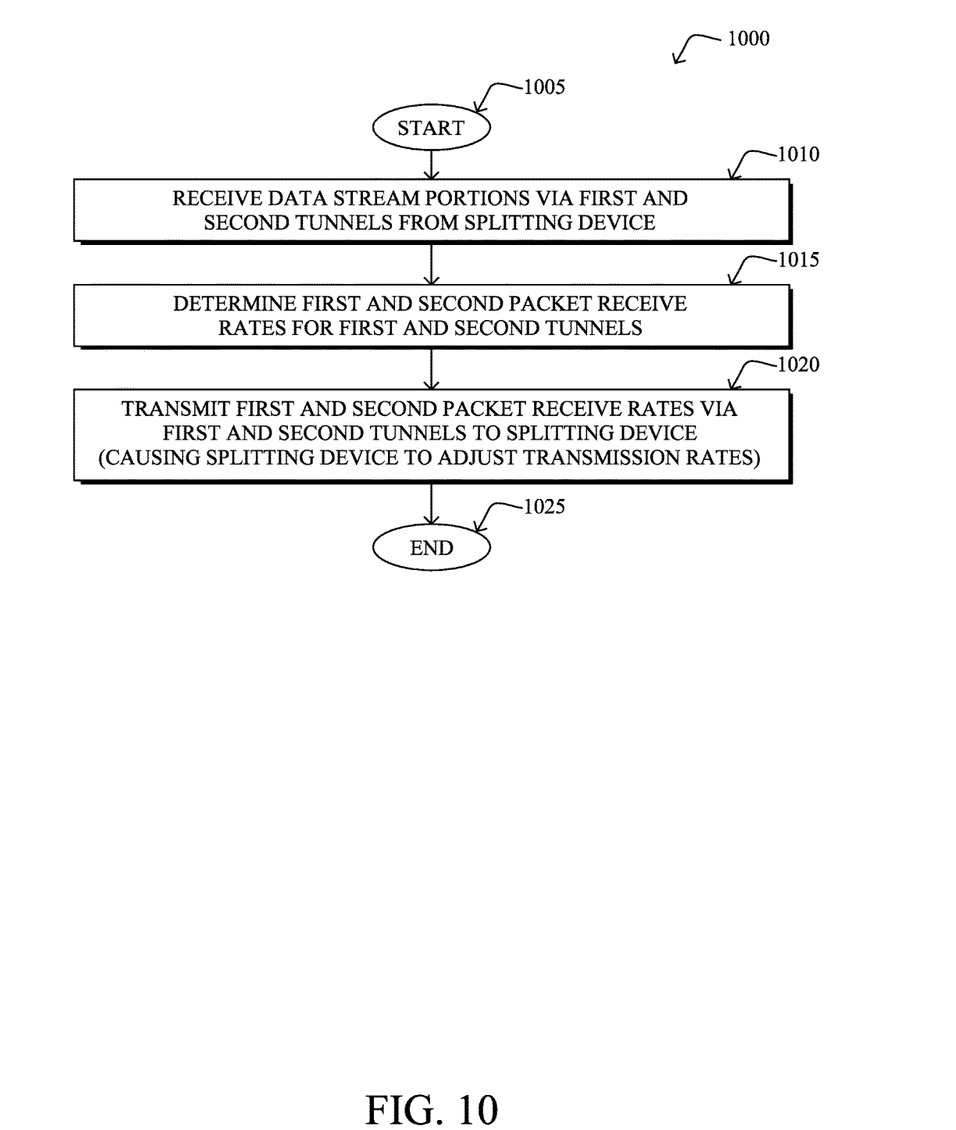

FIGS. 9-10 illustrate example simplified procedures for multi-homed tunnel load balancing in accordance with one or more embodiments described herein. For example, a non-generic, specifically configured device (e.g., device 200) may perform procedures 900 and 1000 by executing stored instructions. As shown in FIG. 9, particularly from the perspective of the splitting device, the procedure 900 may start at step 905 and continues to step 910, where, as described in greater detail above, a splitting device in a computer network (e.g., OTP edge router 310) transmits data stream portions (412/414) of a data stream via multiple tunnels (321/322) to a combining device (e.g., OTP home router 350). As mentioned above, packets 500 of the data stream 410 (portions 412/414) indicate a time of transmission (516) of the packets from the splitting device, a first and second transmission rate (514, corresponding to and within each of the first and second tunnels) of the packets on a respective one of the first and second tunnels, and sequencing information (518) of the packets within the data stream.

At step 915, as described in more detail above, the splitting device receives packet receive rates via the first and second tunnels (messages 630 and 640, respectively). The rates may be determined by the combining device and, further, may be transmitted by the combining device to the splitting device via the tunnels.

At step 920, the splitting device (as received by the combining device), and, as described in more detail above, adjustments may then be made as needed to compensate for decreased tunnel performance. For instance, in step 925, in response to the first tunnel, for example, having a first receive rate that less than the first transmission rate (i.e., the combining device receives the packets at a rate slower than the splitting device is sending them), the splitting device reduces the first transmission rate for the first tunnel and increases the second transmission rate for the second tunnel. Note that additional error correction codes, such as FEC codes, may also be provided within the data stream portion having the increased transmission rate (e.g., on the second tunnel), also as described in more detail above.

On the other hand, if in step 920 the first receive rate is the same as the first transmission rate, but in step 930 the first transmission rate is lower than a first "expected" transmission rate (e.g., an originally determined rate prior to any reductions, such as a "fair share" rate), the splitting device may try to increase the first transmission rate and decrease the second transmission rate (e.g., moving data back from the second tunnel onto the first tunnel) in step 935. In some embodiments, the first transmission rate and the second transmission rate may thus be converged toward an expected transmission rate for the data stream through each of the tunnels. In a specific embodiment, the data stream is carried substantially equally between all tunnels. Procedure 900 illustratively ends at step 940, though notably with the option to continue transmitting packets, receiving rates, comparing the rates, and adjusting the rates, accordingly.

In addition, as shown in FIG. 10, the procedure 1000, which is from the particular perspective of the combining device (e.g., an OTP home router 350), may start at step

1005 and continues to step 1010, where, as described in greater detail above, the combining device receives data stream portions 412/414 via multiple tunnels 321/322 from a splitting device (e.g., OTP edge router 310). Packets 500 of the data stream 410 may illustratively indicate a time of transmission of the packets from the splitting device, a first and second transmission rate of the packets on a respective one of the first and second tunnels, and sequencing information of the packets within the data stream.

At step 1015, as described in more detail above, the combining device determines packet receive rates for each of the tunnels. In particular, first and second receive rates for the packets received from the splitting device via the first and second tunnels respectively are determined by the combining device.

At step 1020, the combining device transmits the packet receive rates for each of the first and second tunnels to the splitting device (messages 630/640). As described above, the receive rates cause a response from the splitting device as described in FIG. 9, adjusting the transmission rates of the tunnels, accordingly. The simplified procedure 1000 may then end at step 1025, notably receiving further packets over the tunnels and returning receive rates, as described herein.

It should be noted that while certain steps within procedures 900 and 1000 may be optional as described above, the steps shown in FIG. 9 and FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900 and 1000 are described separately, certain steps from each procedure may be incorporated into each other procedure, and the procedures are not meant to be mutually exclusive.

The multi-homed load balancing techniques of the present disclosure provide a rate-based flow control with jitter and latency compensation and further utilize cross-linking of error correction codes or network coding. According to the techniques herein, two or more tunnels established within separate networks linking a data source device (e.g., source of media streaming) and a client device operate in parallel, where a splitting device and combining device operate together to adjust data stream portions transmitted via each tunnel as needed to maximize load balancing between them in order to produce the equivalent of an aggregate bandwidth for real time traffic. For example, by transmitting the current receive rates that the combining device receives for portions of the data stream via each tunnel, the splitting device may then adjust the transmission rates through the tunnels, as described in more detail above, to account for the actual functionality (e.g., available bandwidth) of the network. The rates may be adapted periodically, with a period that is long enough to observe the consequences of an adaptation. In this way, even multiple flows may be delivered to multiple host devices, using the bandwidth that is available where it is available, regardless of certain of the flows being larger or smaller, or multi-homed or not.

While there have been shown and described illustrative embodiments that provide for load balancing in a multi-homed computer network, it is to be understood that various other adaptations and modifications may be made within the spirit and scope of the embodiments herein. For example, the embodiments may, in fact, be used with a variety of types of networks and/or protocols and data flows (e.g., streamed media or otherwise). Furthermore, while, in general, embodiments describe two networks in which single tunnels are established, other combinations of tunnels and networks may also be possible (e.g., multiple tunnels over a same network, more than two tunnels, more than two networks, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein

What is claimed is:

1. A method, comprising:
  including, by a splitting device in a computer network, in a first portion of a data stream via a first tunnel, error correction code corresponding to a second portion of the data stream;
  including, by the splitting device, in the second portion of the data stream via a second tunnel, error correction code corresponding to the first portion of the data stream;
  transmitting, by the splitting device to a combining device, the first and second portions of the data stream via the first and second tunnels, respectively, wherein packets of the data stream indicate a time of transmission of the packets from the splitting device, a first and second transmission rate of the packets on a respective one of the first and second tunnels, and sequencing information of the packets within the data stream;
  receiving, by the splitting device from the combining device, a first and second receive rate of the packets for each of the first and second tunnels, respectively;
  in response to the first receive rate being less than the first transmission rate, reducing, by the splitting device, the first transmission rate and increasing the second transmission rate; and
  in response to reducing the first transmission rate, increasing an amount of the error correction code corresponding to the first portion of the data stream that is included in the second portion of the data stream via the second tunnel.

2. The method as in claim 1, further comprising:
  in response to the first receive rate being the same as the first transmission rate when the first transmission rate is lower than an expected transmission rate for the data stream on the first tunnel, increasing, by the splitting device, the first transmission rate and decreasing the second transmission rate.

3. The method as in claim 1, further comprising:
  receiving, from the combining device, a first and second latency for the packets on each of the first and second tunnels, respectively; and
  adjusting the time of transmission of the packets to compensate for a difference between the first and second latency to cause the packets of substantially close sequential information to be received by the combining device on each of the first and second tunnels at substantially close times.

4. The method as in claim 1, further comprising:
advertising an address prefix for the combining device for home networking control protocol (HNCP) services to access the combining device.

5. The method as in claim 1, further comprising:
converging the first transmission rate and second transmission rate toward an expected transmission rate for the data stream on each of the first tunnel and second tunnel, respectively.

6. The method as in claim 1, wherein the first and second tunnels traverse first and second service provider networks, respectively.

7. The method as in claim 1, wherein the data stream is a media stream.

8. The method as in claim 1, further comprising:
receiving the first and second receive rate of the packets in-band on each of the first and second tunnels, respectively.

9. The method as in claim 1, further comprising:
receiving the first and second receive rate of the packets at a variable rate.

10. An apparatus, comprising:
one or more network interfaces to communicate within a computer network;
a processor coupled to the network interfaces and adapted to execute one or more processes; and
a memory configured to store a process executable by the processor, the process when executed operable to:
include in a first portion of a data stream via a first tunnel, error correction code corresponding to a second portion of the data stream;
include in the second portion of the data stream via a second tunnel, error correction code corresponding to the first portion of the data stream;
transmit, to a combining device, the first and second portions of the data stream via the first and second tunnels, respectively, wherein packets of the data stream indicate a time of transmission of the packets from the splitting device, a first and second transmission rate of the packets on a respective one of the first and second tunnels, and sequencing information of the packets within the data stream;
receive, from the combining device, a first and second receive rate of the packets for each of the first and second tunnels, respectively;
in response to the first receive rate being less than the first transmission rate:
reduce the first transmission rate, and
increase the second transmission rate; and
in response to reducing the first transmission rate, increase an amount of the error correction code corresponding to the first portion of the data stream that is included in the second portion of the data stream via the second tunnel.

11. The apparatus as in claim 10, wherein the process when executed is further operable to:
in response to the first receive rate being the same as the first transmission rate when the first transmission rate is lower than an expected transmission rate for the data stream on the first tunnel, increase the first transmission rate and decrease the second transmission rate.

12. The apparatus as in claim 10, wherein the process when executed is further operable to:
receive, from the combining device, a first and second latency for the packets on each of the first and second tunnels, respectively; and
adjust the time of transmission of the packets to compensate for a difference between the first and second latency to cause the packets of substantially close sequential information to be received by the combining device on each of the first and second tunnels at substantially close times.

13. The apparatus as in claim 10, wherein the process when executed is further operable to:
advertise an address prefix for the combining device for home networking control protocol (HNCP) services to access the combining device.

* * * * *